United States Patent
Koshy (10) Patent No.: US 7,418,396 B2
(45) Date of Patent: Aug. 26, 2008

(54) REDUCED MEMORY IMPLEMENTATION TECHNIQUE OF FILTERBANK AND BLOCK SWITCHING FOR REAL-TIME AUDIO APPLICATIONS

(75) Inventor: Sunoj Koshy, Palm Meadows (IN)

(73) Assignee: Broadcom Corporation, Irvine, CA (US)

( * ) Notice: Subject to any disclaimer, the term of this patent is extended or adjusted under 35 U.S.C. 154(b) by 823 days.

(21) Appl. No.: 10/685,184

(22) Filed: Oct. 14, 2003

(65) Prior Publication Data
US 2005/0080617 A1 Apr. 14, 2005

(51) Int. Cl.
G10L 19/00 (2006.01)
G10L 19/02 (2006.01)
H03M 7/00 (2006.01)
(52) U.S. Cl. .................... 704/501; 704/203; 341/50
(58) Field of Classification Search .............. None
See application file for complete search history.

(56) References Cited
U.S. PATENT DOCUMENTS
6,199,039 B1 * 3/2001 Chen et al. ............ 704/229
6,344,808 B1 * 2/2002 Taruki et al. ............ 341/65
7,065,491 B2 * 6/2006 Tsai et al. .............. 704/500

OTHER PUBLICATIONS

Tsai et al ("Architecture Design for MPEG-2 AAC Filterbank Decoder Using Modified Regressive Method", Acoustics, Speech, and Signal Processing, 2002. Proceedings. (ICASSP '02). IEEE International Conference on vol. 3, May 13-17, 2002 pp. III-3216-III-3219 vol. 3).*

Paik et al. ("Design of a novel synthesis filter for real-time MPEG-2 audio decoder implementation on a DSP chip", Consumer Electronics, IEEE Transactions on Publication Date: Nov. 1999).*

* cited by examiner

Primary Examiner—David R. Hudspeth
Assistant Examiner—Samuel G Neway
(74) Attorney, Agent, or Firm—McAndrews Held & Malloy Ltd.

(57) ABSTRACT

Presented herein is a reduced memory implementation technique of filterbank and block switching for real-time audio applications. Calculation of the pulse code modulated samples from the IMDCT samples and inverse window functions is simplified by exploiting the symetric qualities of the IMDCT function. As a result, memory requirements and operations are significantly reduced.

14 Claims, 5 Drawing Sheets

REDUCED MEMORY IMPLEMENTATION TECHNIQUE OF FILTERBANK AND BLOCK SWITCHING FOR REAL-TIME AUDIO APPLICATIONS

RELATED APPLICATIONS

Not Applicable

FEDERALLY SPONSORED RESEARCH OR DEVELOPMENT

Not Applicable

MICROFICHE/COPYRIGHT REFERENCE

Not Applicable

BACKGROUND OF THE INVENTION

Pursuant to the MPEG-2 Advanced Audio Coding (MPEG-2 AAC) standard, audio signals are sampled frequencies starting from 8 kHz to 96 kHz. The samples are grouped into consecutive frames of 1024 samples. The frames are grouped into windows that comprise 2048 samples. However, each window has a 50% overlap with the previous window. Accordingly, the first 1024 samples of a window are the same as the last 1024 samples of the previous window. A window function is applied to each window, resulting in sets of 2048 windowed samples. The modified discrete cosine transformation (MDCT) is applied to each set of windowed samples, resulting in 1024 frequency coefficients. The frequency coefficients are then quantized and coded for transmission.

The first step in decoding is to establish the frame synchronization. Once the frame synchronization is found, the AAC bitstream is demultiplexed. This includes Huffman decoding, scale factor decoding, and the decoding of the side information used in tools such as mono/stereo, intensity stereo, TNS, and the filter bank. The spectral samples are decoded and copied to the output buffer in a samples fashion. After Huffman decoding, each coefficient must be inverse quantizated by a 4/3 power nonlinearity and then scaled by the quantizer step size. Finally, the Inverse MDCT (IMDCT) transforms the spectral coefficients into time domain. After the IMDCT transform, the output samples are windowed, overlapped, and added for generating the final pulse code modulate (PCM) samples.

As each block is encoded independently, the effect of quantization noise is different in different blocks. This results in a large noise at the block boundaries when the blocks are decoded. The MDCT is a linear orthogonal lapped transform, based on the idea of time domain aliasing cancellation (TDAC). Though the MDCT is 50% overlapped, a sequence data after MDCT has the same number of coefficients as samples before the transform (after overlap-and-add). This means that a single block of IMDCT data does not correspond to the original block on which the MDCT was performed. When subsequent blocks of inverse transformed data are added using 50% overlap, the errors introduced by the transform cancels out the TDAC and effectively removes an otherwise easily detectable blocking artifact between transform blocks.

The IMDCT output is mapped to the full spectrum for subsequent use in the window overlap add to implement the window overlap add. For a window sequence of length 2048, the memory includes a present frame buffer of 2048 samples, previous frame buffer of 1024, and a window coefficient buffer of 2048 coefficients. The implementation of the window overlap add is computationally intensive.

Further limitations and disadvantages of conventional and traditional systems will become apparent to one of skill in the art through comparison of such systems with the invention as set forth in the remainder of the present application with reference to the drawings.

BRIEF SUMMARY OF THE INVENTION

Presented herein is a reduced memory implementation technique of filterbank and block switching for real-time audio applications. In one embodiment, there is presented a method for calculating pulse code modulated samples. The pulse code modulated samples are calculated by accessing an IMDCT sample from a previous set of IMDCT samples, accessing an IMDCT sample from a present set of IMDCT samples, calculating a first pulse code modulated sample from the accessed IMDCT sample from the previous set of IMDCT samples and the accessed IMDCT sample from the present set of IMDCT samples, and calculating a second pulse code modulated sample from the accessed IMDCT sample from the previous set of IMDCT samples and the accessed IMDCT sample from the present set of IMDCT samples.

In another embodiment, there is presented a system for calculating pulse code modulated samples. The system includes a first address register, a second address register, and an arithmetic logic unit. The first address register accesses an IMDCT sample from a previous set of IMDCT samples. The second address register accesses an IMDCT sample from a present set of IMDCT samples. The arithmetic logic unit calculates a first pulse code modulated sample from the accessed IMDCT sample from the previous set of IMDCT samples and the accessed IMDCT sample from the present set of IMDCT samples and calculates a second pulse code modulated sample from the accessed IMDCT sample from the previous set of IMDCT samples and the accessed IMDCT sample from the present set of IMDCT samples.

In another embodiment, there is presented a circuit for calculating PCM samples. The circuit includes a processor and an instruction memory. The processor executes a plurality of executable instructions. The instruction memory stores the plurality of executable instructions. Execution of the executable instructions causes accessing an IMDCT sample from a previous set of IMDCT samples from a first memory, accessing an IMDCT sample from a present set of IMDCT samples from a second memory, calculating a first pulse code modulated sample from the accessed IMDCT sample from the previous set of IMDCT samples and the accessed IMDCT sample from the present set of IMDCT samples, and calculating a second pulse code modulated sample from the accessed IMDCT sample from the previous set of IMDCT samples and the accessed IMDCT sample from the present set of IMDCT samples.

These and other advantages and novel features of the present invention, as well as details of an illustrated embodiment thereof, will be more fully understood from the following description and drawings.

DETAILED DESCRIPTION OF THE INVENTION

Figure 1:
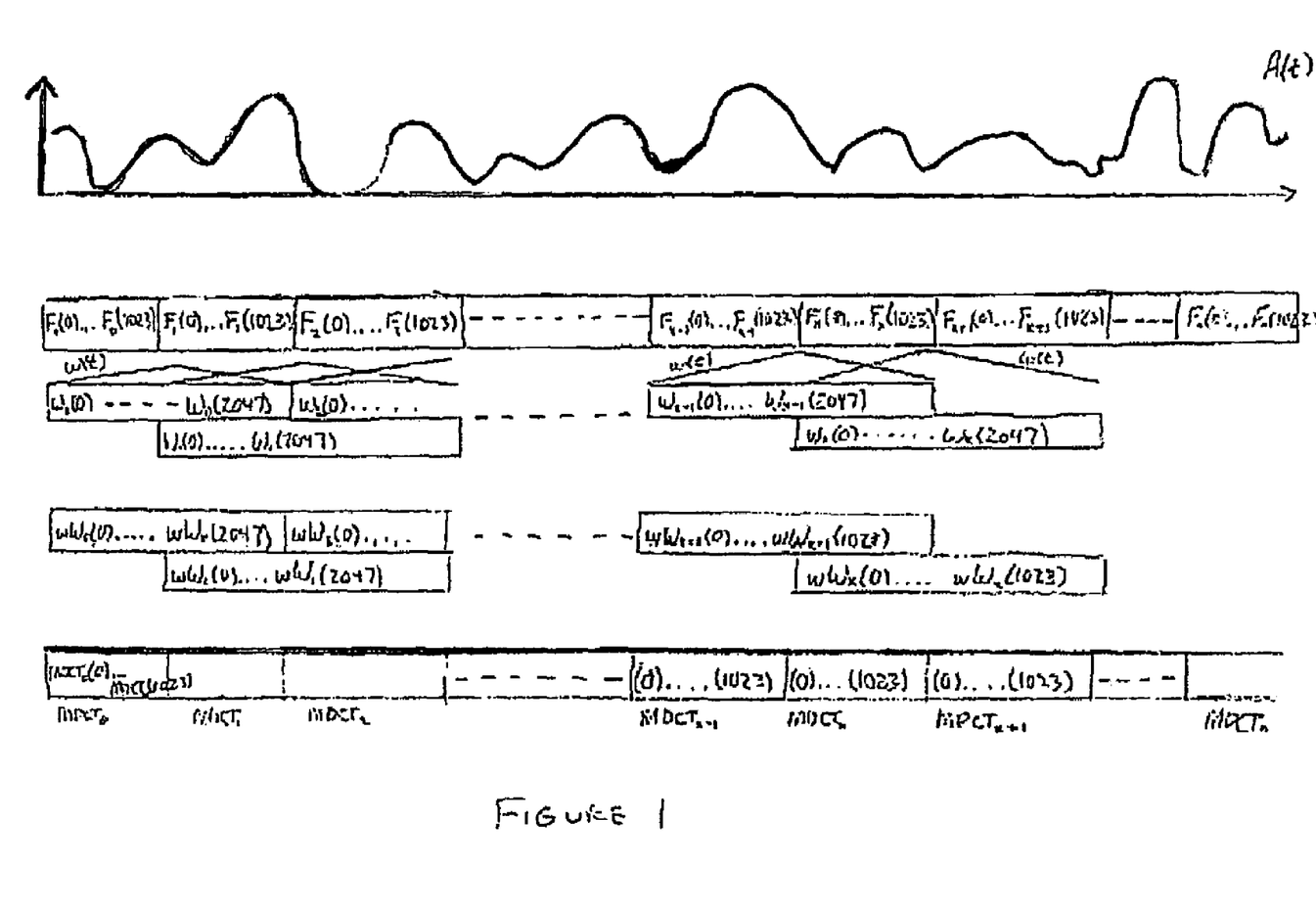
FIG. 1 is a block diagram describing the encoding of an audio signal.

Referring now to FIG. 1, there is illustrated a block diagram describing the encoding of an exemplary audio signal A(t). Pursuant to the MPEG-2 Advanced Audio Coding (MPEG-2 AAC) standard, the audio signal is sampled at rates starting at 8K samples/sec to 96K samples/sec. The samples are grouped into frames $F_0 \ldots F_n$ of 1024 samples, e.g., $F_x(0) \ldots F_x(1023)$. The frames $F_0 \ldots F_n$ are grouped into windows $W_0 \ldots W_n$ that comprise 2048 samples, e.g., $W_x(0) \ldots W_x(2047)$. However, each window $W_x$ has a 50% overlap with the previous window $W_{x-1}$. Accordingly, the first 1024 samples of a window $W_x$ are the same as the last 1024 samples of the previous window $W_{x-1}$. A window function w(t) is applied to each window $W_0 \ldots W_n$, resulting in sets $wW_0 \ldots wW_n$ of 2048 windowed samples, e.g., $wW_x(0) \ldots wW_x(2047)$. The modified discrete cosine transformation (MDCT) is applied to each set $wW_0 \ldots wW_n$ of windowed samples $wW_x(0) \ldots wW(2047)$, resulting sets $MDCT_0 \ldots MDCT_n$ of 1024 frequency coefficients, e.g., $MDCT_x(0) \ldots MDCT_x(1023)$.

The sets of frequency coefficients $MDCT_0 \ldots MDCT_n$ are then quantized and coded for transmission, forming what is known as an audio elementary stream AES. The AES can be multiplexed with other AES. The multiplexed signal, known as the Audio Transport Signal (TS) can then be stored and/or transported for playback on a playback device. The playback device can either be local or remotely located. Where the playback device is remotely located, the multiplexed signal is transported over a communication medium, such as the internet. During playback, the Audio TS is demultiplexed, resulting in the constituent AES signals. The constituent AES signals are then decoded, resulting in the audio signal.

Figure 2:
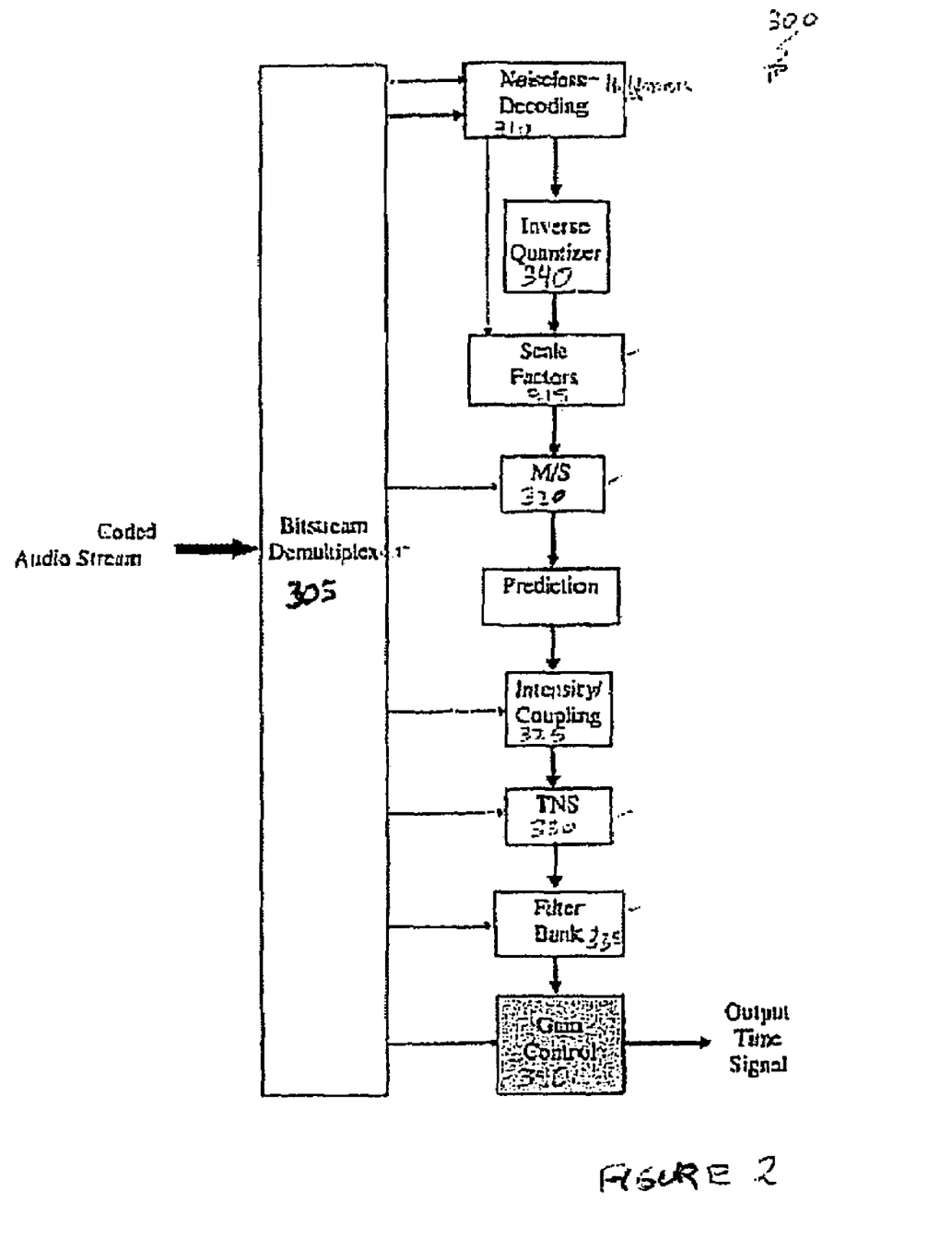
FIG. 2 is a block diagram of an exemplary audio decoder in accordance with an embodiment of the present invention.

Referring now to FIG. 2, there is illustrated a block diagram describing an exemplary audio decoder 300 in accordance with an embodiment of the present invention. Once the frame synchronization is found, the AAC bitstream is demultiplexed by a bitstream demultiplexer 305. The bitstream demultiplexer separates the parts of the MPEG-2 AAC data stream into the parts for each tool, and provides each of the tools with the bitstream information related to that tool. The AAC decoder includes Huffman decoding 310, scale factor decoding 315, and the decoding of the side information used in tools such as mono/stereo 320, intensity stereo 325, TNS 330, and the filter bank 335. The sets of frequency coefficients $MDCT_0 \ldots MDCT_n$ are decoded and copied to the output buffer in a sample fashion. After Huffman decoding 310, an inverse quantizer 340 inverse quantizes each set of frequency coefficients $MDCT_0 \ldots MDCT_n$ by a 4/3 power nonlinearity. The scale factors 315 are then used to scale sets of frequency coefficients $MDCT_0 \ldots MDCT_n$ by the quantizer step size. Additionally, tools including the mono/stereo 320, intensity stereo 325, TNS 330, and can apply further functions to the sets of frequency coefficients $MDCT_0 \ldots MDCT_n$. Finally, the filter bank 335 transforms the frequency coefficients $MDCT_0 \ldots MDCT_n$ into the time domain signal A(t).

The filter bank 335 transforms the frequency coefficients by application of the Inverse MDCT (IMDCT), the inverse window function, window overlap, and window adding.

Figure 3:
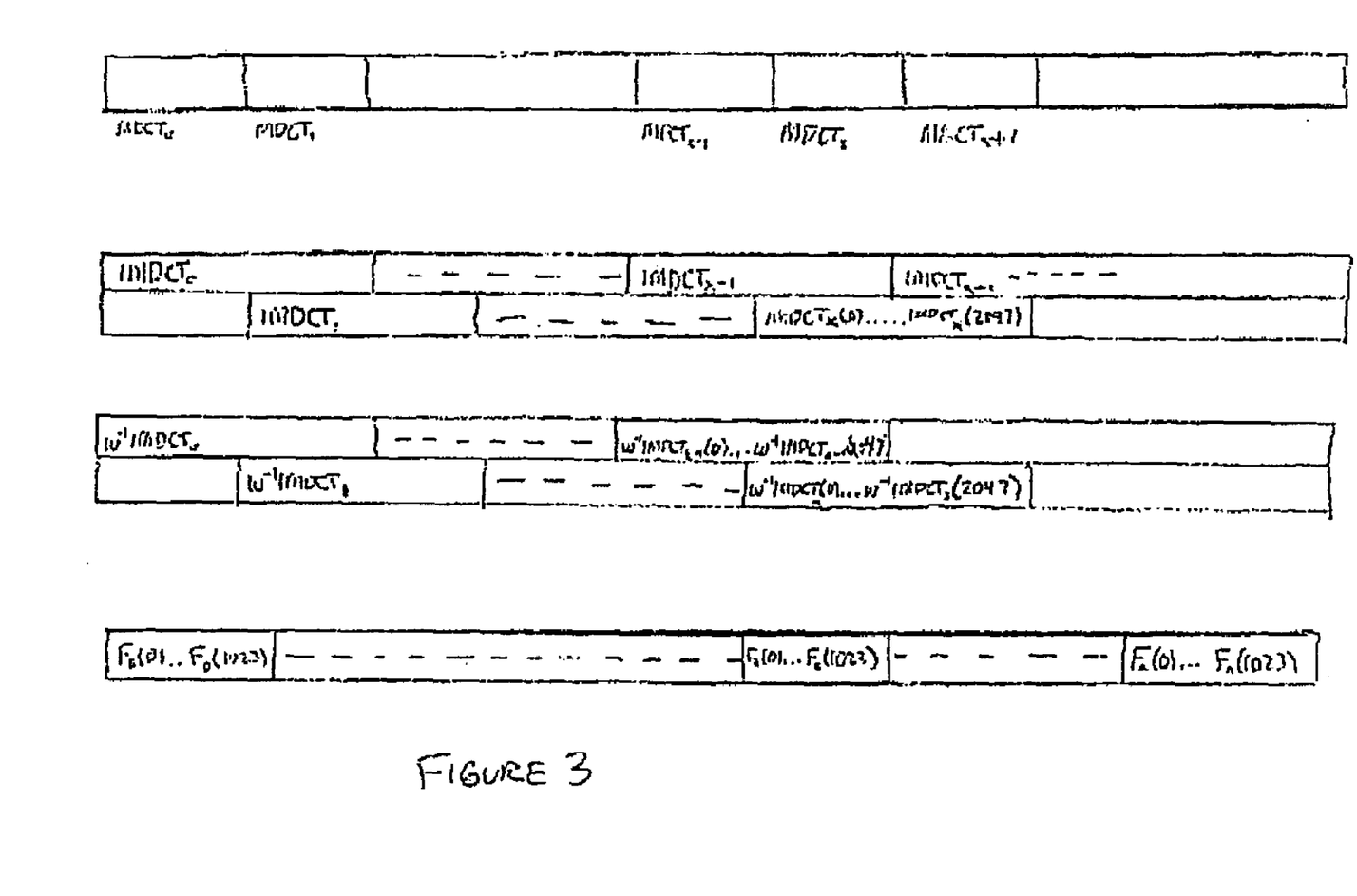
FIG. 3 is a block diagram describing the decoding of an audio signal.

Referring now to FIG. 3, there is illustrated a block diagram describing the transformation of the frequency coefficients $MDCT_0 \ldots MDCT_n$ into the time domain signals A(t). Application of the IMDCT to the sets of frequency coefficients $MDCT_0 \ldots MDCT_n$ results in overlapping sets $IMDCT_0 \ldots IMDCT_n$ of 2048 IMDCT samples, e.g., $IMDCT_x(0) \ldots IMDCT_x(2047)$. The inverse window function $w^{-1}(t)$ is applied to each set of $IMDCT_0 \ldots IMDCT_n$ of 2048 IMDCT samples $IMDCT_x(0) \ldots IMDCT_x(2047)$, resulting in overlapping sets $w^{-1}IMDCT_0 \ldots w^{-1}IMDCT_n$ of 2048 dewindowed samples, e.g., $w^{-1}IMDCT_x(0) \ldots w^{-1}IMDCT_x(2047)$ The overlapping sets $w^{-1}IMDCT_0 \ldots w^{-1}IMDCT_n$ of 2048 dewindowed samples $w^{-1}IMDCT_x(0) \ldots w^{-1}IMDCT_x(2047)$ are then added, e.g., $w^{-1}IMDCT_x(0) \ldots w^{-1}IMDCT_x(1023)$ is added to $w^{-1}IMDCT_{x-1}(1024) \ldots w^{-1}IMDCT_{x-1}(2047)$, e.g., resulting in the frames $F(0) \ldots F(n)$ with 1024 PCM samples $F_x(0) \ldots F_x(1023)$ The symmetry of the IMDCT output can be exploited to simplify the operation of applying the inverse window $w^{-1}(t)$ to each set of $IMDCT_0 \ldots IMDCT_n$ of 2048 IMDCT samples $IMDCT_x(0) \ldots IMDCT_x(2047)$, and adding the overlapping portions of the dewindowed samples, e.g., $w^{-1}IMDCT_x(0) \ldots w^{-1}IMDCT_x(1023)$, and $w^{-1}IMDCT_{x-1}(1024) \ldots w^{-1}IMDCT_{x-1}(2047)$. As a result, there is no need to unfold the IMDCT output $IMDCT(0) \ldots IMDCT(n)$ to the full spectrum and the samples are read only once. The foregoing results in the reduced memory requirements and processor operations.

For 2048-point IMDCT, it is noted that $IMDCT_x(0) = -IMDCT_x(1023)$, $IMDCT_x(1) = -IMDCT_x(1022)$, and $IMDCT_x(1024) = IMDCT_x(2047)$, and $IMDCT_x(1025) = IMDCT_x(2046)$. The dewindowed samples $w^{-1}IMDCT_x(0) \ldots w^{-1}IMDCT_x(n)$ can be calculated with the following formula:

$$w^{-1}IMDCT_x(i) = w^{-1}(x) * IMDCT_x(i)$$

where $w^{-1}(i)$ is a constant

The samples $F_x(0) \ldots F_x(1023)$ for frame $F_x$ are determined by adding the overlapping portions of the dewindowed samples $w^{-1}IMDCT_x(0) \ldots w^{-1}IMDCT_x(1023)$, and $w^{-1}IMDCT_{x-1}(1024) \ldots w^{-1}IMDCT_{x-1}(2047)$ As a result, for frame $F_x$, the samples $F_x(0) \ldots F_x(1023)$ can be calculated with the following formula:

$$F_x(i) = w(i) * IMDCT_x(i) + w(i+1024) * IMDCT_{x-1}(i+1024)$$

where i=0 to 1023
  x is the present window index
  x-1 is the previous window index A brute force method would require storage of $IMDCT_{x-1}(1024) \ldots IMDCT_{x-1}(2047)$ $IMDCT_x(0) \ldots IMDCT_x(1023)$, and $w(0) \ldots w(2047)$, a total of 4096 memory locations, as well as 1024 locations for $F_x(0) \ldots F_x(1023)$. Additionally, two memory accesses from the IMDCT samples and two accesses from the inverse window function $w^{-1}(x)$ would be needed for each sample $F_x(0) \ldots F_x(1023)$, for a total of 4096 memory accesses.

The symmetry of the IMDCT samples $IMDCT_x(0) \ldots IMDCT_x(2047)$ can be exploited to reduce the total number of memory locations and memory accesses needed to calculate the samples $F_x(0) \ldots F_x(1023)$ from $IMDCT_{x-1}(1024) \ldots IMDCT_{x-1}(2047)$, $IMDCT_x(0) \ldots IMDCT_x(1023)$ As noted above, $IMDCT_x(x) = -IMDCT_x(1023-x)$, for x=0 to 1023, and $IMDCT_{x-1}(x) = IMDCT_{x-1}(3071-x)$, for x=1024 to 2047. As a result, $IMDCT_x(0) \ldots IMDCT_x(511)$, and $IMDCT_{x-1}(1024) \ldots IMDCT_{x-1}(1535)$ can be stored, while $IMDCT_x(512) \ldots IMDCT_x(1023)$, and IMDCT$_{x-1}$(1536) . . .IMDCT$_{x-1}$(2047) can be determined from IMDCT$_x$(0) . . . IMDCT$_x$(511), and IMDCT$_{x-1}$(1024) . . . IMDCT$_{x-1}$(1535), respectively. The foregoing results in reduced memory consumption.

Additionally, the number of memory accesses can also be reduced. For i=512 to 1023, F$_x$(i) can be calculated by the following formula:

$$F_x(i) = w(i) * -IMDCT_x(1023 - i) + w(i + 1024) * IMDCT_{x-1}(2047 - i)$$

where $i = 512$ to $1023$

For i=0 to 511, F$_x$(i) is calculated as:

$$F_x(i) = w(i) * IMDCT_x(i) + w(i + 1024) * IMDCT_{x-1}(i + 1024)$$

where $i = 0$ to $511$

As can be seen, F$_x$(0) and F$_x$(1023) are both calculated from IMDCT$_x$(0) and IMDCT$_{x-1}$(1024). Similarly, for every i from 0 to 511, F$_x$(i) and F$_x$(1023-i) are calculated from the same IMDCT values, IMDCT$_x$(i) and IMDCT$_{x-1}$(i+1024). Accordingly, F$_x$(i) and F$_x$(1023-i) can be calculated from the same memory access from the stored IMDCT samples.

The samples F$_x$(0) . . . F$_x$(1023) can calculated by executing the following operations for i=0 to 511.

$$F_x(i) = w(i) * IMDCT_x(i) + w(i + 1024) * IMDCT_{x-1}(i + 1024)$$

$$F_x(1023 - i) =$$
$$w(1023 - i) * -IMDCT_x(i) + w(2047 - i) * IMDCT_{x-1}(i + 1024)$$

As can be seen, for each iteration, only two memory accesses are made from the stored IMDCT samples, and four memory accesses from the inverse window function samples are made, for a total of 3072 memory accesses. The foregoing can be used for the samples for frames F0 . . . Fn, thereby reconstructing the signal A(t).

Figure 4:
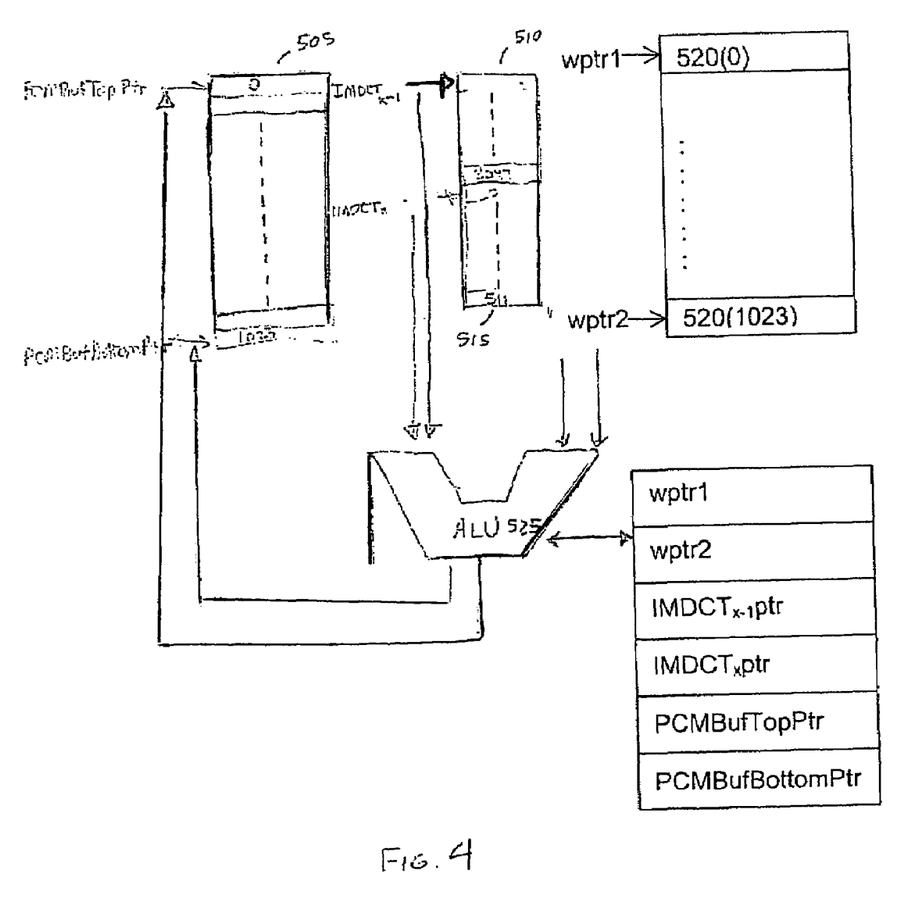
FIG. 4 is a block diagram of a circuit in accordance with an embodiment of the present invention.

Referring now to FIG. 4, there is illustrated a block diagram describing an exemplary circuit for calculating PCM samples F$_x$(0) . . . F$_x$(1023) for a frame F$_x$. The circuit can form a portion of the gain control 340. The circuit includes a PCM buffer 505, a previous window IMDCT buffer 510, a present window IMDCT buffer 515, an inverse window buffer 520, and a processor 522. The processor 522 includes address registers 530, and an arithmetic logic unit (ALU) 525. The previous window IMDCT buffer 510 comprises 512 memory locations 510(1024) . . . 510(1535) for storing IMDCT samples, IMDCT$_{x-1}$(1024) . . . IMDCT$_{x-1}$(1535). The present window IMDCT buffer 515 comprises 512 memory locations 515(0) . . . 515(511) for storing IMDCT samples, IMDCT$_x$(0) . . . IMDCT$_{x-1}$(511). The inverse window buffer 520 comprises 1024 memory locations 520(0) . . . 520(1023) for storing the inverse window buffer 520(0) . . . 520(1023). The PCM buffer 505 comprises 1024 locations 505(0) . . . 505(1023), that are associated with PCM samples F$_x$(0) . . . F$_x$(1023) for a frame F$_x$.

The address registers includes address registers, wptr1, wptr2, IMDCT$_{x-1}$ptr, IMDCT$_x$ptr, PCMBufTopPtr, and PCMBufBottomPtr. The address registers wptr1, wptr2, initially point to inverse window memory locations 520(0), and, 520(1023), , respectively. The inverse window memory locations 520(0), 520(1024), 520(1023), and 520(2047) store inverse window samples w$^{-1}$(0), w$^{-1}$(1024), w$^{-1}$(1023), and w$^{-1}$(2047), respectively.

The address register IMDCT$_{x-1}$ptr initially points to the previous window IMDCT buffer memory location 510(1024). The previous window IMDCT buffer memory location 510(1024) stores IMDCT$_{x-1}$(1024). The address register IMDCT$_x$ptr initially points to the present window IMDCT buffer memory location 515(0). The present window IMDCT buffer memory location 515(0) stores IMDCT$_x$(0).

The PCMBufTopPtr initially points to the PCM Buffer memory location 505(0). The PCMBufBottomPtr initially points to the PCM Buffer memory location 505(1023).

The contents of the memory locations that are referenced by the address registers, wptr1, wptr2, IMDCT$_{x-1}$ptr, and IMDCT$_x$ptr are accessed and the ALU 525 performs arithmetic operations thereon. The results of the arithmetic operations are written to the PCM buffer 505 memory locations referenced by PCMBufTopPtr and PCMBufBottomPtr.

The result of the following arithmetic operation is stored at the memory location reference by PCMBufTopPtr:

$$PCMBufTopPtr = wptr1 * IMDCT_x ptr + wptr2 * IMDCT_{x-1} ptr$$

The result of the following arithmetic operation is stored at the memory location referenced by PCMBufBottomPtr:

$$PCMBufBottomPtr = -wptr2 * IMDCT_x ptr + wptr1 * IMDCT_{x-1} ptr$$

After the following operations are performed, PCMBufTopPtr, wptr1, IMDCT$_x$ptr, and IMDCT$_{x-1}$ptr are incremented, while PCMBufBottomPtr and wptr2 are decremented. After repeating the foregoing for 512 iterations, the PCM buffer 505 stores the PCM samples for a frame F$_x$.

The pseudo-code for the iterations can be described as:

```
for (i=0; i<512; i++)
{
    *PCMBufTopPtr++ = *wptr1* (*IMDCT_x ptr) +
                      *wptr2* (*IMDCT_{x-1} ptr)
    *PCMBufBottomPtr-- = - (*wptr2--) * (*IMDCT_x ptr++)
                         + (*wptr1++) * (*IMDCT_{x-1} ptr++)
}
```

Tables 1 and 2 describe the operations that are performed for both a brute force implementation and an impementation taking advantage of the IMDCT symmetry, respectively.

TABLE 1

| | Ip sample | Prev frame sample | Win coefficients | Op PCM sample | Total |
|---|---|---|---|---|---|
| Read/Write | 1024 | 1024 | 2048 | 1024 | 5120 |
| Multiplication | | | | | 2048 |
| Add/Subtract | | | | | 1024 |
| Total | | | | | 8192 |

TABLE 2

|  | Ip sample | Prev frame sample | Win coefficients | Op PCM sample | Total |
|---|---|---|---|---|---|
| Read/Write | 512 | 512 | 1024 | 1024 | 3072 |
| Multiplication |  |  |  |  | 2048 |
| Add/Subtract |  |  |  |  | 1024 |
| Total |  |  |  |  | 6144 |

Figure 5:
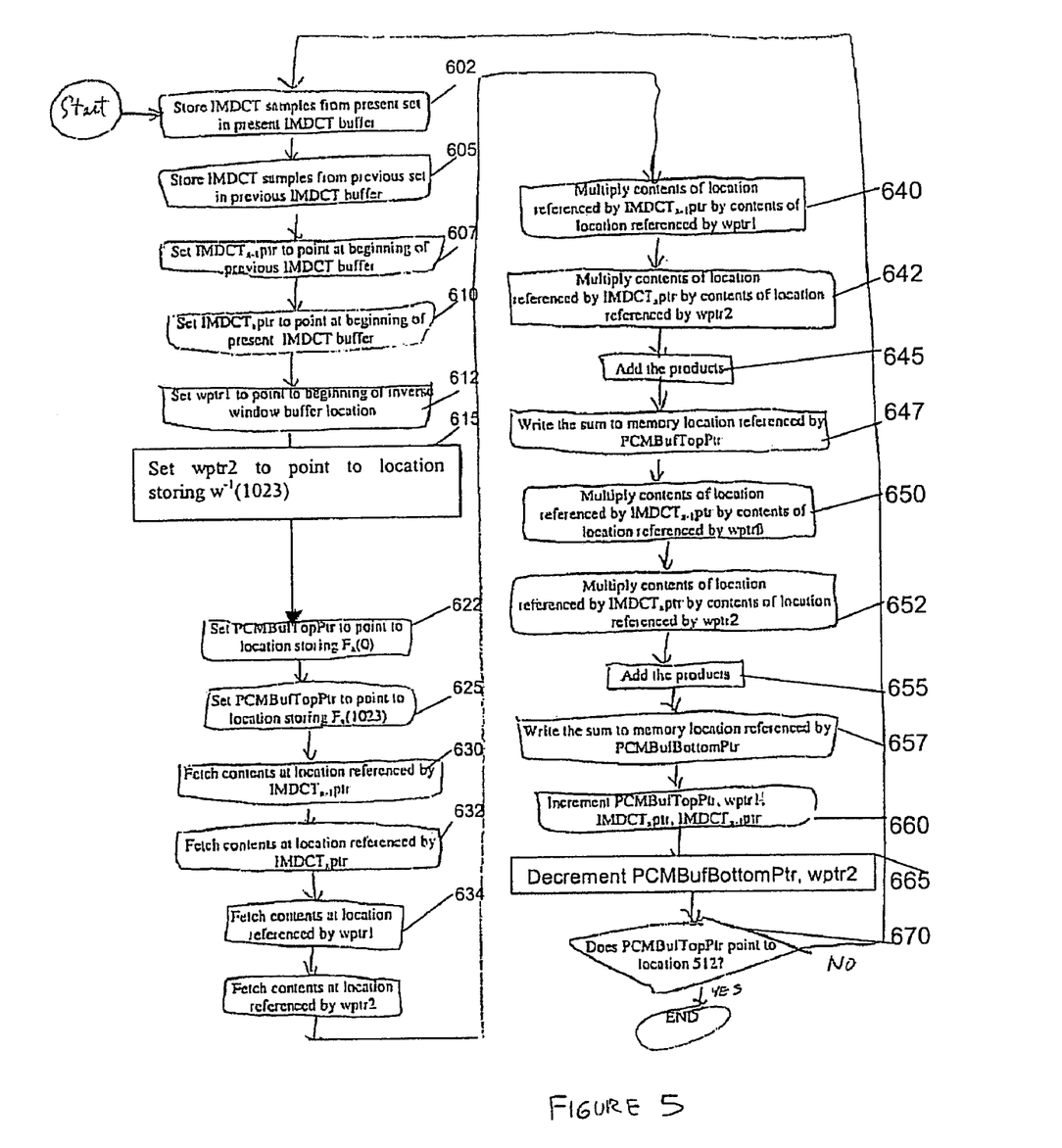
FIG. 5 is a flow diagram for calculating the pulse code modulated samples in accordance with an embodiment of the present invention.

Referring now to FIG. 5, there is illustrated a flow diagram for calculating PCM samples $F_x(0) \ldots F_x(1023)$. At 602, the IMDCT samples $IMDCT_x(0) \ldots IMDCT_x(1023)$ from the present set $IMDCT_x$ of samples are stored in the present IMDCT buffer 515. At 605, IMDCT samples $IMDCT_{x-1}(1024) \ldots IMDCT_{x-1}(2047)$ from the previous set $IMDCT_{x-1}$ of IMDCT samples are stored in the previous IMDCT buffer 510.

At 607, the $IMDCT_{x-1}ptr$ is set to point at the previous IMDCT buffer location 510(1024) storing $IMDCT_{x-1}(1024)$. At 610, the $IMDCT_xptr$ is set to point at the present IMDCT buffer location 515(0) storing $IMDCT_x(0)$.

From 612-615, the inverse window address registers wptr1, wptr2, are initialized. At 612, wptr1 is set to point to the inverse window buffer location 520(0) storing inverse window coefficient $w^{-1}(0)$. At 615, wptr2 is set to point to the inverse window buffer location 520(1023) storing inverse window coefficient $w^{-1}(1023)$.

At 622-625, PCMBufTopPtr and PCMBufBottomPtr are initialized. At 622, PCMBufTopPtr is set to point to the PCM buffer location 505(0) that is associated with $F_x(0)$. At 625, PCMBufBottomPtr is set to point to the PCM buffer location 505(1023) that is associated with $F_x(1023)$.

At 630-634, the contents at the locations referenced by the address registers $IMDCT_{x-1}ptr$ (630), $IMDCT_xptr$ (632), wptr1, wptr2 (634), are fetched.

At 640-647, the first PCM value is calculated from the fetched contents from the locations referenced by the address registers $IMDCT_{x-1}ptr$, $IMDCT_xptr$, wptr1, wptr2. At 640, the contents of the location referenced by $IMDCT_{x-1}ptr$ are multiplied by contents of the location referenced by wptr2. At 642, the contents of the location referenced by $IMDCT_xptr$ are multiplied by the contents of the location referenced by wptr1. At 645, the product during 640 during 642 are added. The foregoing sum is the first PCM value. At 647, the first PCM value is written to the memory location in the PCM buffer 505 referenced by PCMBufTopPtr.

At 650-657, the second PCM value is calculated from the fetched contents from the locations referenced by the address registers $IMDCT_{x-1}ptr$, $IMDCT_xptr$, wptr1, wptr2. At 650, the contents of the location referenced by $IMDCT_{x-1}ptr$ are multiplied by contents of the location referenced by wptr1. At 652, the contents of the location referenced by $IMDCT_xptr$ are multiplied by the contents of the location referenced by wptr2. At 655, the product during 650 is subtracted from the product during 652. The foregoing difference is the second PCM value. At 657, the second PCM value is written to the memory location in the PCM buffer 505 referenced by PCMBufBottomPtr.

At 660, the address registers PCMBufTopPtr, wptr1, $IMDCT_xptr$, and $IMDCT_{x-1}ptr$ are incremented, while at 665, the address registers PCMBufBottomPtr, wptr2 are decremented. At 670, a determination is made whether PCMBufTopPtr points to location 505(512). If during 670 PCMBufTopPtr points to location 505(512), the calculation of the PCM samples $F_x(0) \ldots F_x(1023)$ is completed for $F_x$ and 602-670 are repeated for the PCM samples $F_{x+1}(0) \ldots F_{x+1}(1023)$ for frame $F_{x+1}$. If during 670, PCMBufTopPtr does not point to location 505(512), then 630-670 are repeated.

The systems and circuits as described herein may be implemented as a board level product, as a single chip, application specific integrated circuit (ASIC), or with varying levels of the decoder system integrated with other portions of the system as separate components. The degree of integration of the decoder system will primarily be determined by speed and cost considerations. Because of the sophisticated nature of modern processor, it is possible to utilize a commercially available processor, which may be implemented external to an ASIC implementation. Alternatively, if the processor is available as an ASIC core or logic block, then the commercially available processor can be implemented as part of an ASIC device wherein certain operations are implemented in firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A method for calculating pulse code modulated samples, said method comprising:

accessing an IMDCT sample from a previous set of IMDCT samples;

accessing an IMDCT sample from a present set of IMDCT samples;

calculating a first pulse code modulated sample from the accessed IMDCT sample from the previous set of IMDCT samples and the accessed IMDCT sample from the present set of IMDCT samples; and calculating a second pulse code modulated sample from the accessed IMDCT sample from the previous set of IMDCT samples and the accessed IMDCT sample from the present set of IMDCT samples;

a second address register for incrementing a first address register, said first register referencing a memory location in the first memory, the memory location in the first memory storing the IMDCT sample from the previous set of IMDCT samples; and incrementing a second address register, said second register referencing a memory location in the second memory, the memory location in the second memory storing the IMDCT samples from the present set of IMDCT samples;

storing the first pulse code modulated sample in a memory location in a third memory; and storing the second pulse code modulated sample in another memory location in the third memory incrementing a third address register, said third register referencing the memory location in the third memory; and decrementing a fourth address register, said fourth address register referencing the memory location in the third memory.

2. The method of claim 1, wherein calculating the second pulse code modulated sample comprises inverting the accessed IMDCT sample from the present set of IMDCT samples.

3. The method of claim 1, further comprising:
accessing a first inverse window coefficient; and
accessing a second inverse window coefficient.

4. The method of claim 3, wherein calculating the first pulse code modulated sample further comprises:
multiplying the accessed IMDCT sample from the previous set of IMDCT samples with the first inverse window coefficient; and
multiplying the accessed IMDCT sample from the present set of IMDCT samples with the second inverse window coefficient.

5. The method of claim 4, wherein calculating the second pulse code modulated samples further comprises:
accessing a third inverse window coefficient; and
accessing a fourth inverse window coefficient.

6. The method of claim 5, further comprising:
multiplying the accessed IMDCT sample from the previous set of IMDCT samples with a third inverse window coefficient; and
multiplying the accessed IMDCT sample from the present set of IMDCT samples with a fourth inverse window coefficient.

7. A system for calculating pulse code modulated samples, said method comprising:
a first address register for accessing an IMDCT sample from a previous set of IMDCT samples;
a second address register for accessing an IMDCT sample from a present set of IMDCT samples;
an arithmetic logic unit for calculating a first pulse code modulated sample from the accessed IMDCT sample from the previous set of IMDCT samples and the accessed IMDCT sample from the present set of IMDCT samples and calculating a second pulse code modulated sample from the accessed IMDCT sample from the previous set of IMDCT samples and the accessed IMDCT sample from the present set of IMDCT samples; and
a first memory for storing a portion of the previous set of IMDCT samples, the portion of the previous set of IMDCT samples comprising a last half of the previous set of IMDCT samples
a second memory for storing a portion of the present set of IMDCT samples, the portion of the present set of IMDCT samples comprising a first half of the present set of IMDCT samples;
a third memory for storing a plurality of inverse window coefficients;
a third address register for accessing a first one of the inverse window samples by decrementing; and
a fourth address register for accessing a second one of the inverse window samples by decrementing.

8. The system of claim 7, wherein the arithmetic logic unit calculates the second PCM sample by inverting the accessed IMDCT sample from the present set of IMDCT samples.

9. The system of claim 7, further comprising:
a fifth address register for accessing a third one of the inverse window samples; and
a sixth address register for accessing a fourth one of the inverse window samples.

10. The system of claim 9, wherein the arithmetic logic unit multiplies the accessed IMDCT sample from the previous set of IMDCT samples with the first inverse window coefficient and multiplies the accessed IMDCT sample from the present set of IMDCT samples with the second inverse window coefficient.

11. The system of claim 10, wherein the arithmetic logic unit multiplies the accessed IMDCT sample from the previous set of IMDCT samples with the third inverse window coefficient and multiplies the accessed IMDCT sample from the present set of IMDCT samples with the fourth inverse window coefficient.

12. The system of claim 7, further comprising:
a fourth memory for storing the first pulse code modulated sample and the second pulse code modulated sample.

13. A circuit for calculating PCM samples, said circuit comprising:
a processor for executing a plurality of executable instructions;
an instruction memory for storing the plurality of executable instructions, wherein execution of the executable instructions causes:
accessing an IMDCT sample from a previous set of IMDCT samples from a first memory;
accessing an IMDCT sample from a present set of IMDCT samples from a second memory;
calculating a first pulse code modulated sample from the accessed IMDCT sample from the previous set of IMDCT samples and the accessed IMDCT sample from the present set of IMDCT samples; and
calculating a second pulse code modulated sample from the accessed IMDCT sample from the previous set of IMDCT samples and the accessed IMDCT sample from the present set of IMDCT samples;
wherein the processor further comprises:
a first address register for referencing a memory location in the first memory, the memory location in the first memory storing the IMDCT sample from the previous set of IMDCT samples; and
a second address register for referencing a memory location in the second memory, the memory location in the second memory storing the IMDCT samples from the present set of IMDCT samples;
wherein execution of the plurality of instructions further causes:
incrementing the first address register; and
incrementing the second address register;
storing the first pulse code modulated sample in a memory location in a third memory; and
storing the second pulse code modulated sample in another memory location in the third memory
wherein the processor further comprises:
a third address register for referencing the memory location in the third memory; and
a fourth address register for referencing the memory location in the third memory
wherein execution of the plurality of instructions further causes:
incrementing the third address register; and
decrementing the fourth address register.

14. The method of claim 1, wherein said IMDCT samples comprise reconstructed values from application of the Inverse Modified Discrete Cosine Transformation to modified discrete cosine transformation values.

* * * * *